(12) United States Patent
Bode et al.

(10) Patent No.: US 7,646,128 B2
(45) Date of Patent: Jan. 12, 2010

(54) ROTOR FOR ELECTRIC MOTOR, COMPRESSOR UNIT PROVIDED WITH ROTOR, METHOD FOR PRODUCING A ROTOR FOR AN ELECTRIC MOTOR

(75) Inventors: Ralf Bode, Moers (DE); Wolfram Graf, Essen (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 11/629,570

(22) PCT Filed: Jun. 10, 2005

(86) PCT No.: PCT/NL2005/000428

§ 371 (c)(1),
(2), (4) Date: Jul. 12, 2007

(87) PCT Pub. No.: WO2005/124973

PCT Pub. Date: Dec. 29, 2005

(65) Prior Publication Data

US 2007/0290569 A1    Dec. 20, 2007

(30) Foreign Application Priority Data

Jun. 15, 2004    (NL) .................................. 1026424

(51) Int. Cl.
*H02K 19/14*    (2006.01)
(52) U.S. Cl. .................................................... 310/211
(58) Field of Classification Search ......... 310/211–212, 310/52, 54, 58, 59, 86
See application file for complete search history.

(56) References Cited

U.S. PATENT DOCUMENTS

| | | | |
|---|---|---|---|
| 2,192,841 A | | 3/1940 | Rendell |
| 3,497,737 A | * | 2/1970 | Philofsky ..................... 310/54 |
| 4,644,210 A | * | 2/1987 | Meisner et al. ............. 310/211 |
| 4,692,644 A | * | 9/1987 | Lenz et al. .................. 310/178 |
| 6,579,431 B1 | | 6/2003 | Bolcavage et al. |
| 2003/0071533 A1 | * | 4/2003 | Kikuchi et al. .............. 310/211 |
| 2004/0012293 A1 | * | 1/2004 | Kuemmlee et al. .......... 310/211 |

FOREIGN PATENT DOCUMENTS

| | | |
|---|---|---|
| EP | 0 786 855 A1 | 7/1997 |
| GB | 2 089 583 A | 6/1982 |
| JP | 03261354 | * 11/1991 |

* cited by examiner

*Primary Examiner*—Renee Luebke
*Assistant Examiner*—Sean Kayes

(57) ABSTRACT

A rotor for an electric motor according to the invention comprises a substantially cylindrical core, conductive rods and two short-circuit rings. The cylindrical core is formed from a core material and provided with a plurality of longitudinal grooves which extend substantially in the direction of the cylinder axis. The conductive rods are formed from an electrically conductive material and are provided in the longitudinal grooves of the cylindrical core. The two short-circuit rings conductively connect the axial ends of the conductive rods to one another. A diffusion layer extends between the conductive rods and the cylindrical core. The diffusion layer comprises a diffusion material.

17 Claims, 2 Drawing Sheets

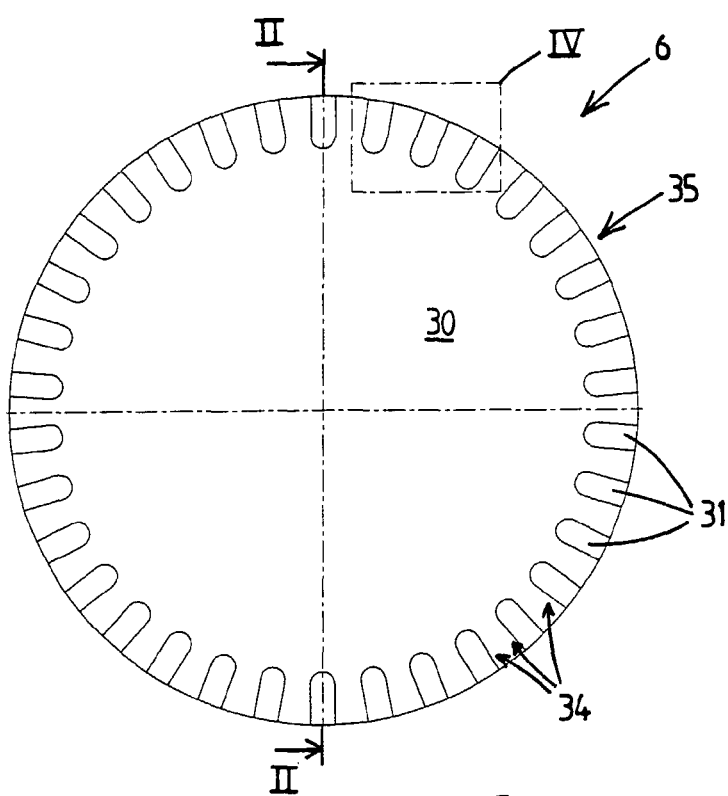
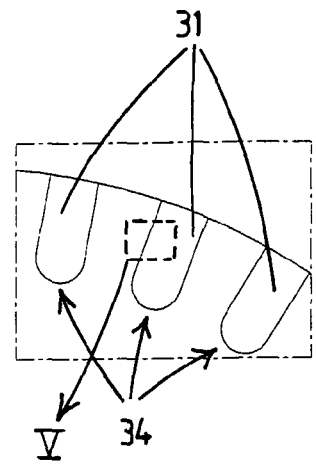
Fig. 4
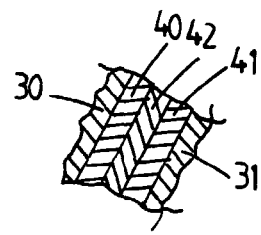
Fig. 5
Fig. 3
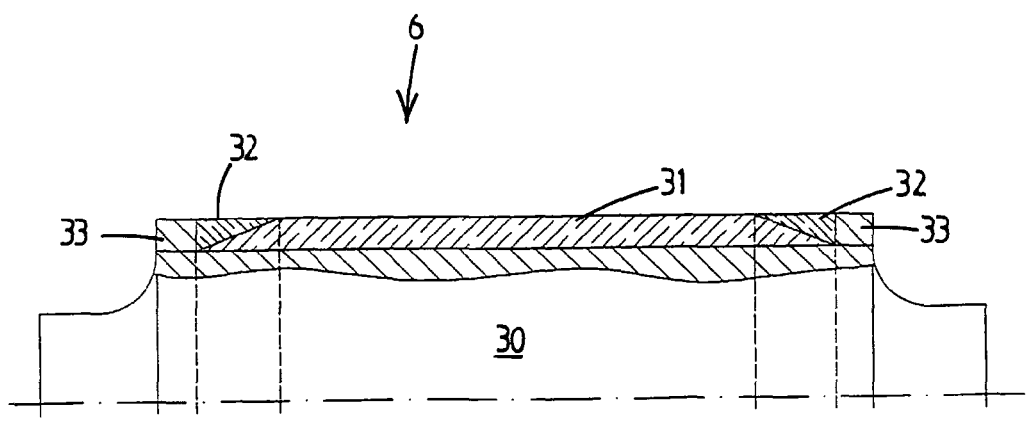
Fig. 2

ROTOR FOR ELECTRIC MOTOR, COMPRESSOR UNIT PROVIDED WITH ROTOR, METHOD FOR PRODUCING A ROTOR FOR AN ELECTRIC MOTOR

CROSS REFERENCE TO RELATED APPLICATIONS

This application is the US National Stage of International Application No. PCT/NL2005/000428, filed Jun. 10, 2005 and claims the benefit thereof. The International Application claims the benefits of Dutch Patent application No. 1026424 filed Jun. 15, 2004. All of the applications are incorporated by reference herein in their entirety.

FIELD OF INVENTION

The invention relates to a rotor for an electric motor, to a compressor unit provided with a rotor of this type, and to a method for producing a rotor for an electric motor.

BACKGROUND OF THE INVENTION

A rotor of this type is known from JP H 3-261354. This document discloses a steel cylinder, the surface of which is provided with a plurality of longitudinal grooves. The longitudinal grooves are relatively narrow at the surface of the cylinder and widen out beneath the surface to form substantially round cross sections. Copper rods are provided in the longitudinal grooves and are conductively connected to one another at their axial ends by copper short-circuit rings. According to the text of the document, the copper rods are connected to the cylinder by means of hot or cold isostatic pressing.

One drawback of the known rotor is that in reality it does not provide a connection between the rods and cylinder which is able to withstand the centripetal forces which occur at high rotational speeds. To the extent that there is any connection, this can only be ascribed to the positive lock between the rods and the longitudinal grooves, and not to the relevant materials bonding to one another.

SUMMARY OF INVENTION

The object of the present invention is to provide a rotor for an electric motor in which these drawbacks are at least partially overcome, or to provide a useable alternative.

In particular, it is an object of the invention to ensure that the conductive rods are reliably joined to the core of the rotor.

According to the invention, this object is achieved by a rotor for an electric motor. The rotor for an electric motor comprises a substantially cylindrical core, conductive rods and two short-circuit rings. The cylindrical core is formed from a core material and provided with a plurality of longitudinal grooves which extend substantially in the direction of the cylinder axis. The conductive rods are formed from an electrically conductive material and are provided in the longitudinal grooves of the cylindrical core. The two short-circuit rings conductively connect the axial ends of the conductive rods to one another. A diffusion layer extends between the conductive rods and the cylindrical core. The diffusion layer comprises a diffusion material.

The diffusion of the diffusion material into the materials of the conductive rods and/or the cylindrical core produces a diffusion layer which provides good bonding between the core material and the electrically conductive material.

In particular, the diffusion layer is composed of at least two zones, with the first zone substantially adjoining the cylindrical core and comprising both the core material and the diffusion material. The second zone substantially adjoins the conductive rods and comprises both the electrically conductive material and the diffusion material. Very good bonding is achieved on account of the fact that the diffusion material has diffused both into the cylindrical core and into the conductive rods.

In one embodiment, the diffusion material comprises nickel. In practice, it has been found that nickel leads to a good diffusion bond between steel and copper, materials which in practice are in widespread use for the cylinder shaft and the conductive rods, respectively.

In one advantageous embodiment, the cylindrical core and the conductive rods, at the location of at least one axial end of the conductive rods, comprise a conical part, and the corresponding short-circuit ring comprises, on its axially inner side, a part which is complementary in form. In use, a short-circuit ring connected in this way gives a favourable distribution of the electric current across the cross section. Moreover, a large conductive surface area is created between the short-circuit ring, on the one hand, and the cylindrical core and the conductive rods, on the other hand.

Furthermore, it is expedient for the rotor to be provided with two end rings which extend around the cylindrical core and retain the conductive rods and the short-circuit rings in the axial direction. Rings of this nature increase the strength of the rotor and shield the axial ends of the short-circuit rings.

In particular, the end rings are provided with balancing openings on their outer side. Balancing openings of this type are provided in order to remove material at that location or to create the option of adding a material in order to bring the rotor into balance. This improves the rotary performance of the rotor at high rotational speeds and causes the loading on a bearing arrangement for the rotor to decrease.

In one embodiment, the conductive rods comprise two parallel walls. It is advantageous for the longitudinal grooves in the cylinder core also to comprise substantially parallel walls, with the result that both the longitudinal grooves and the conductive rods are simple to produce and it is easy for the conductive rods to be fitted in the longitudinal grooves.

In one particular embodiment, the rotor is provided with a protective layer. A protective layer of this type protects the rotor of an electric motor which is in direct contact with an aggressive medium. This aspect of the invention can advantageously be employed separately from the other aspects of the invention.

In particular, the protective layer comprises a metal, for example Inconel.

The invention also relates to an electric motor, comprising a rotor and a stator.

The invention furthermore relates to a compressor unit, comprising a centrifugal compressor for compressing a gas, and an electric motor.

In particular, the rotor for the electric motor and a rotor of the centrifugal compressor are aligned and fixedly connected to one another. A direct connection of this type results in a compact overall structure of the compressor unit and strong coupling which is able to withstand high loads.

The invention also relates to a method for producing a rotor for an electric motor. The method according to the invention comprises the following steps:

providing a substantially cylindrical core with longitudinal grooves, applying a diffusion material in the longitudinal grooves and/or on the conductive rods, positioning the conductive rods in the longitudinal grooves, and joining the conductive rods to the core by supplying heat and applying pressure to at least the conductive rods.

The application of a diffusion material before heat is supplied and pressure is applied gives rise to a durable diffusion bond.

In particular, the diffusion material is applied by electroplating. This represents a simple and inexpensive form of application while at the same time making it possible to achieve a high level of purity for the diffusion material applied.

In one embodiment, the conductive rods and the optional end rings are under a vacuum during the step of supplying heat and pressure. On account of the vacuum, there is no air between the components which are to be joined, with the result that no oxidation occurs while the connection is being produced and that no air is included, which could lead to a local weak spot.

Finally, the invention relates to a method for producing a continuous, common rotor for a centrifugal compressor, comprising the steps of:

producing a rotor for an electric motor, connecting the rotor for an electric motor to a rotor for a centrifugal compressor.

On account of this method, the rotor for the electric motor can be produced separately using the method described above. In this case, only this part of the common rotor has to undergo the treatment steps described, which has beneficial consequences in practice with regard to the supply of heat, the application of pressure and the creation of a vacuum. Subsequently joining the rotor produced in this way for an electric motor to a rotor for a centrifugal compressor produces a common rotor which can be used to good effect in a centrifugal compressor.

Further embodiments of the invention are described in the subclaims.

BRIEF DESCRIPTION OF THE DRAWING

The invention will be explained in more detail in the following description of an embodiment of a compressor unit according to the invention with reference to the drawing, in which:

FIG. 2 shows a partial longitudinal section through a rotor, on line II-II in FIG. 3, FIG. 3 shows a cross section through the rotor shown in FIG. 2, FIG. 4 shows a detail IV from FIG. 3, and FIG. 5 shows a detail V from FIG. 4.

DETAILED DESCRIPTION OF INVENTION

Figure 1:
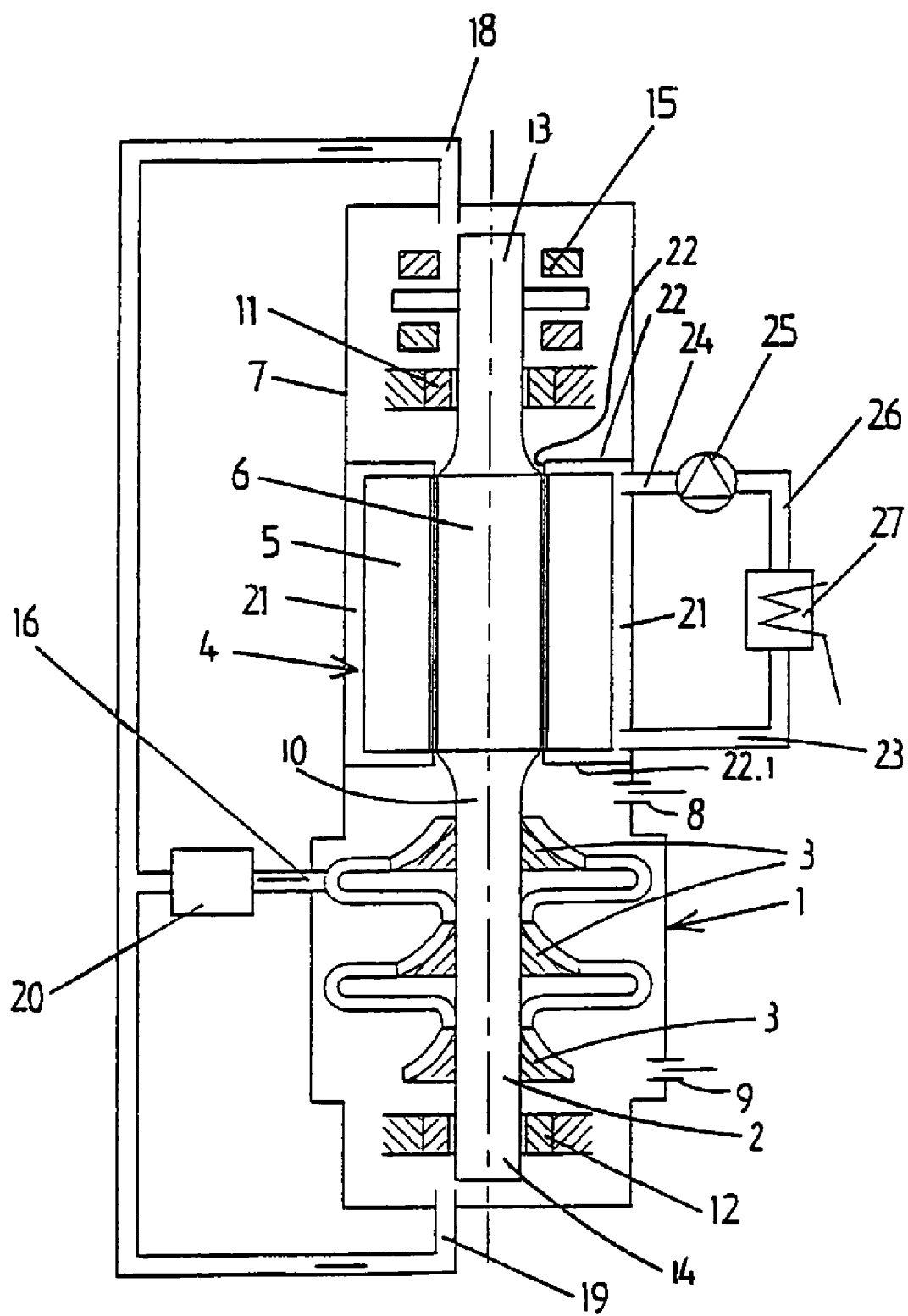
FIG. 1 diagrammatically depicts an embodiment of the compressor unit.

The compressor unit illustrated in FIG. 1 comprises a centrifugal compressor 1 for compressing a gas, for example process gas, having a rotor 2 with one or more, in this case three compressor impellers 3 and an electric motor 4 having a stator 5 and a rotor 6 for driving the rotor 2 of the compressor. The compressor 1 and the electric motor 4 are accommodated in a common gastight housing 7 which is provided with a gas inlet 8 and a gas outlet 9.

The rotor 2 of the compressor 1 and the rotor 6 of the electric motor 4 form part of a common rotor shaft 10 which forms a single unit. The rotor shaft 10 is mounted in two magnetic radial bearings 11 and 12 which are each arranged in the vicinity of one end 13 and 14, respectively, of the rotor shaft 10, and a magnetic axial bearing 15 arranged in the vicinity of the radial bearing 11.

The compressor unit is provided with a cooling system for cooling the magnetic bearings 11, 12, 15 and the rotor 6 of the electric motor 4. This cooling system comprises a line 16 which runs from the compressor and branches into lines 18 and 19 running to the magnetic bearings 11, 12, 15. A filter 20 is incorporated in the line 16 running from the compressor. Compressed gas is tapped off at an intermediate stage of the compressor 1 for the purpose of cooling the rotor 6 of the electric motor 4 and the magnetic bearings 11, 12, 15, and this gas is passed through the line 16 and the filter 20 and then fed in metered fashion to the magnetic bearings 11 and 15 and 12, respectively, via the lines 18 and 19. The cooling gas is collected again inside the compressor unit and passed to the inlet section of the compressor.

The stator 5 of the electric motor 4 is accommodated in a stator space 21 which is separate from the rest of the interior of the compressor unit and is delimited by that wall section of the housing 7 of the compressor unit which surrounds the stator 5, as well as a partition 22. The stator space 21 is provided with an inlet 23 and an outlet 24 for a separate cooling medium, which is pumped around a cooling circuit 26 by a pump 25. A heat exchanger 27 is incorporated in the cooling circuit 26.

The rotor 6 of the electric motor 4 comprises a substantially cylindrical steel core 30, conductive copper rods 31, copper short-circuit rings 32 and steel end rings 33 (FIG. 2-4). The copper rods 31 each have two substantially parallel walls and are rounded, as seen in cross section, along two other sides. The first rounding results in a smooth transition from the first side to the second side. The second rounding forms virtually a right angle with the straight side walls and has a curvature which corresponds to the radius of curvature of the cross section of the cylindrical core 30. The copper rods 31 are provided in complementary longitudinal grooves 34 in the cylindrical core 30. The end rings 33 are provided on their outer side with balancing openings (not shown in the figures). Weight may be fitted in these openings, which may be provided with an internal screw thread, in order to balance the rotor 6. Alternatively, the rotor 6 can be balanced by the removal of material from one of the end rings 33.

The radially outer surface of the rotor 6, in particular the surface of the copper rods 31 and the radially outer surface of the short-circuit rings 32, is protected from the action of, for example, process gas from the centrifugal compressor 1 by a protective layer 35, formed from Inconel. The axial ends of the short-circuit rings 32 are protected by the steel end rings 33.

FIG. 5 shows a detailed illustration of the connection between a copper rod 31 and the corresponding wall of a longitudinal groove 34 of the cylindrical core 30. Between the steel of the cylindrical core 30 and the copper of the conductive rods 31 there is a diffusion layer which is composed of three zones 40, 41 and 42. The first zone 40 comprises both steel from the cylindrical core 30 and nickel from the intermediate zone 42. The second zone 41 comprises both copper from the conductive rods 31 and nickel from the intermediate zone 42. The intermediate zone 42 comprises virtually exclusively nickel and fills up any differences between the surfaces of the first and second zones 40, 41.

A rotor according to the invention can be produced in the following way. As the first step, a solid steel core is lathe-turned until it reaches the correct dimensions. Longitudinal grooves are milled into a centrally located part, as seen in the axial direction, of this steel core. It is preferable for the width of these longitudinal grooves, as seen in the direction towards the centre of the core, in each case to decrease or remain constant. Furthermore, copper rods are formed, for example by milling; the shape and dimensions of these copper rods correspond to those of the longitudinal grooves in the steel core. In the vicinity of the ends of the longitudinal grooves, the steel core is reduced in size by turning, to form a part having a small diameter which corresponds to the deepest position of the milled-out longitudinal grooves, and a conically shaped part which connects the central part having the largest diameter to the part having the small diameter. The ends of the copper rods are milled into a shape which corresponds to the conical shape of the core.

Two copper rings are turned to size. The external diameter substantially corresponds to the external diameter of the centrally located part of the cylindrical core. The internal diameter of the copper rings corresponds to the external diameter of the part of the cylindrical core having the small diameter. A part of the radially inner side of the copper rings is turned to produce a shape which corresponds to the conical profile of the cylindrical core.

Finally, two steel rings are turned, with an internal diameter which corresponds to the external diameter of the part of the cylindrical core which has the small diameter. The external diameter of the steel rings substantially corresponds to the external diameter of the centrally located part of the cylindrical core.

The joining surfaces of the cylindrical steel core, the copper rods, the copper short-circuit rings and the steel end rings are electroplated with nickel, preferably pure nickel. Then, the copper rods are fitted into the longitudinal grooves, the copper short-circuit rings are fitted to the conical ends and finally the steel end rings are fitted onto the copper short-circuit rings in the axial direction. By virtue of the preferred shape of the longitudinal grooves, the copper rods can be moved into the longitudinal grooves radially from the surface of the core.

Then, a stainless steel, cylindrical sleeve is fitted around that part of the rotor where the copper rods, copper short-circuit rings and steel end rings are located. Steel rings which join the stainless steel sleeve to the steel core and end rings are welded onto the two ends of the sleeve, thereby producing a capsule around the cylindrical core.

Air is extracted through an opening in the capsule, with the result that a high vacuum is formed inside the capsule. Then, the opening is closed off in an airtight manner. Before or during the application of the vacuum, it is possible for the air to be replaced by nitrogen, which further reduces the risk of oxygen being included, which would give rise to oxidation in the following step, and may also allow the vacuum level required to be reduced.

Then, the rotor including all its components and the capsule are heated to approximately 1030° C. Also, a high gas pressure is built up outside the capsule, for example with the aid or argon. The combination of temperature and pressure ensures that the nickel diffuses into both the steel of the cylindrical core and the copper of the conductive rods and the short-circuit rings. On account of the preferred form of the longitudinal grooves, the pressure which is applied to the copper rods from the outside via the stainless steel capsule is distributed uniformly, via the copper—which has been liquefied by the temperature—over the contact surfaces with the longitudinal grooves.

The resulting diffusion bond is able to withstand very high loads, in particular forces which occur at rotational speeds of approximately 250 metres per second.

Then, the pressure is removed and the rotor is cooled. This can be followed by a heat treatment to improve the materials properties. Then, the steel capsule is removed by turning.

Finally, the surface of the rotor is provided with a protective layer. For this purpose, first of all Inconel is applied with the aid of an explosive cladding process (detonation cladding). Then, the pores in the Iconel are sealed using a polymer resin, for example an epoxy resin.

The rotor obtained in this way for an electric motor can be used on its own as such, but may also be directly joined, for example by welding, to a rotor for a centrifugal compressor. The two rotors may be made from the same steel grade or may be made from different steel grades.

In addition to the embodiments shown and described, numerous variants are possible. For example, it is possible to use other materials, in which case it is important for the cylindrical core to be a magnetizable material, while the conductive rods need to have good electrically conductive properties. Apart from pure copper, various copper alloys, aluminium and other metals also satisfy this requirement. It is also possible for other materials, such as zinc, to be used as the diffusion material. The diffusion may be diffused into the core material and/or into the electrically conductive material.

For electric motors which are not frequency-controlled, it may be advantageous if the walls of the conductive rods are not oriented parallel, but rather radially with respect to the axis of the rotor. It is also possible for other materials to be used as the protective layer. Metals and other materials which have a good thermal conductivity are preferred in this context.

Therefore, the invention provides a rotor for an electric motor in which the copper rods are joined so well to the core that the rotor is able to withstand very high rotational speeds. Moreover, on account of the protective layer, a rotor for this type can be used under aggressive conditions. It is advantageous for a rotor of this type to be used in a compressor unit, with the centrifugal compressor and the electric motor being provided in a common housing.

The invention claimed is:

1. An electric motor, comprising:
    an electric motor stator;
    an electric motor rotor having a substantially cylindrical core, made from a core material and having a plurality of longitudinal grooves extending substantially parallel to an axis of the cylinder;
    a plurality of conductive rods made from an electrically conductive material and arranged in the longitudinal grooves;
    two short-circuit rings that conductively connect axial ends of the conductive rods to one another;
    a diffusion layer extending between the conductive rods and the cylindrical core and comprising a diffusion material that is different from the core material and the electrically conductive material of the conductive rods;
    wherein the electric motor rotor forms a common rotor shaft with a compressor rotor;
    wherein the common rotor shaft is mounted on magnetic radial bearings;
    wherein the compressor rotor includes at least one impeller;

wherein the electric motor rotor, compressor rotor, common rotor shaft, magnetic radial bearings, and at least one impeller are accommodated in a common gastight housing;

wherein the electric motor stator is provided in a gastight housing area which includes a stator space surrounding the cylindrical core, the stator space being formed by a wall section of the gastight housing and a partition, the stator space being provided with a dedicated cooling circuit having a pump, a cooling medium, and a heat exchanger solely for use within the stator space, wherein the cooling medium circulates through the cooling circuit in direct contact with the stator, and wherein a separate cooling medium circulates through cooling system lines to cool the electric motor rotor, compressor rotor, common rotor shaft, and magnetic radial bearings.

2. The electric motor according to claim 1, wherein the diffusion layer comprises a first zone, a second zone, and nickel diffusion material interconnecting the first zone and the second zone, wherein the cylindrical core is composed of steel and the conductive rods are composed of copper, wherein the first zone substantially adjoins the cylindrical core and comprises both steel from the cylindrical core and nickel from the diffusion material, and the second zone substantially adjoins the conductive rods and comprises both copper from the conductive rods and nickel from the diffusion material.

3. The electric motor according to claim 1, wherein the diffusion layer comprises a first zone and a second zone, where:

the first zone substantially adjoins the cylindrical core and comprises both the core material and the diffusion material, and the second zone substantially adjoins the conductive rods and comprises both the electrically conductive material and the diffusion material.

4. The electric motor according to claim 1, wherein the diffusion material comprises nickel.

5. The electric motor according to claim 1, wherein the cylindrical core and the conductive rods at the location of one of the axial ends of the conductive rods is conically tapering in form and the corresponding short-circuit ring has a complementary geometry on a radially inner side.

6. The electric motor according to claim 1, further comprising two end rings that extend around the cylindrical core and retain the short-circuit rings in the axial direction.

7. The electric motor according to claim 1, wherein the conductive rods comprise two parallel walls.

8. The electric motor according to claim 1, wherein the rotor is surrounded in a protective layer to protect the rotor against an aggressive medium.

9. The electric motor according to claim 8, wherein the protective layer is Inconel.

10. The electric motor according to claim 8, wherein a cross-section of each of the conductive rods has two substantially straight parallel walls and further includes a first rounding and a second rounding respectively along a first other side and a second other side of the respective conductive rod such that the two parallel walls and the first and second other sides form the perimeter of the respective conductive rod.

11. The electric motor according to claim 10 wherein the plurality of conductive rods are respectively positioned within complementary longitudinal grooves provided in the cylindrical core.

12. An electric motor, comprising:
an electric motor stator;
an electric motor rotor comprising:
a substantially cylindrical core, made from a core material and having a plurality of longitudinal grooves extending substantially parallel to the cylinder axis,
a plurality of conductive rods made from an electrically conductive material and arranged in the longitudinal grooves,
two short-circuit rings that conductively connect axial ends of the conductive rods to one another, and
a diffusion layer extending between the conductive rods and the cylindrical core and comprising a diffusion material that is different from the core material and the electrically conductive material of the conductive rods; and
wherein a cross-section of each of the conductive rods has two substantially straight parallel walls and further includes a first rounding and a second rounding respectively along a first other side and a second other side of the respective conductive rod such that the two parallel walls and the first and second other sides form the perimeter of the respective conductive rod,
wherein the electric motor rotor forms a common rotor shaft with a compressor rotor;
wherein the common rotor shaft is mounted on magnetic radial bearings;
wherein the compressor rotor includes at least one impeller;
wherein the electric motor rotor, compressor rotor, common rotor shaft, magnetic radial bearings, and at least one impeller are accommodated in a common gastight housing;
wherein the electric motor stator is provided in a gastight housing area which includes a stator space surrounding the cylindrical core of the rotor, the stator space being formed by a wall section of the gastight housing and a partition, the stator space being provided with a dedicated cooling circuit having a pump, a cooling medium, and a heat exchanger solely for use within the stator space,
wherein the cooling medium circulates through the cooling circuit in direct contact with the stator space, and
wherein a separate cooling medium circulates through cooling system lines to cool the electric motor rotor, compressor rotor, common rotor shaft, and magnetic radial bearings.

13. The electric motor according to claim 12, wherein the diffusion layer comprises a first zone, a second zone, and nickel diffusion material interconnecting the first zone and the second zone, wherein the cylindrical core is composed of steel and the conductive rods are composed of copper, wherein the first zone substantially adjoins the cylindrical core and comprises both steel from the cylindrical core and nickel from the diffusion material, and the second zone substantially adjoins the conductive rods and comprises both copper from the conductive rods and nickel from the diffusion material.

14. The electric motor according to claim 12, wherein the rotor is coaxially aligned and fixedly attached to a centrifugal compressor.

15. The electric motor according to claim 12 wherein the first rounding of the each of the respective conductive rods results in a smooth transition from each respective conductive rod first other side to each respective conductive rod second other side, and the second rounding of each respective conductive rod forms virtually a right angle with the substantially straight parallel side walls of each respective conductive rod and has a curvature which corresponds to the curvature of a cross-section of the cylindrical core.

16. The electric motor according to claim 12 wherein the first rounding of the each of the respective conductive rods results in a smooth transition from each respective conductive rod first other side to each respective conductive rod second other side, and the second rounding of each respective conductive rod forms virtually a right angle with the substantially straight parallel side walls of each respective conductive rod and has a curvature which corresponds to the curvature of a cross-section of the cylindrical core.

17. The electric motor according to claim 12 wherein the plurality of conductive rods are respectively positioned within complementary longitudinal grooves provided in the cylindrical core.

\* \* \* \* \*